(12) United States Patent
Okuyama et al.

(10) Patent No.: US 8,761,526 B2
(45) Date of Patent: Jun. 24, 2014

(54) IMAGE DATA PROCESSING APPARATUS, IMAGE DATA PROCESSING METHOD, AND COMPUTER READABLE MEDIUM

(75) Inventors: Junichi Okuyama, Kanagawa (JP); Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 238 days.

(21) Appl. No.: 13/309,050

(22) Filed: Dec. 1, 2011

(65) Prior Publication Data
US 2012/0275715 A1  Nov. 1, 2012

(30) Foreign Application Priority Data
Apr. 28, 2011 (JP) .................................. 2011-102130

(51) Int. Cl.
*G06K 9/36* (2006.01)
(52) U.S. Cl.
USPC ............................................ 382/232; 362/307
(58) Field of Classification Search
None
See application file for complete search history.

(56) References Cited

U.S. PATENT DOCUMENTS

| | | | | |
|---|---|---|---|---|
| 7,433,528 B2* | 10/2008 | Nishikawa | ...................... | 382/239 |
| 7,711,938 B2* | 5/2010 | Wise et al. | ...................... | 712/300 |
| 2002/0133690 A1* | 9/2002 | Yano et al. | ........................ | 712/34 |
| 2002/0176482 A1* | 11/2002 | Chien | ............................ | 375/132 |
| 2003/0182544 A1* | 9/2003 | Wise et al. | ...................... | 712/300 |
| 2005/0144515 A1* | 6/2005 | Yano et al. | ......................... | 714/7 |
| 2006/0008163 A1* | 1/2006 | Nishikawa | ...................... | 382/239 |
| 2006/0061794 A1* | 3/2006 | Ito et al. | ......................... | 358/1.13 |
| 2008/0133899 A1* | 6/2008 | Park et al. | ...................... | 712/229 |
| 2010/0229120 A1* | 9/2010 | Inoue et al. | ................... | 715/811 |
| 2011/0143811 A1* | 6/2011 | Rodriguez | ................. | 455/556.1 |
| 2011/0212717 A1* | 9/2011 | Rhoads et al. | ................. | 455/420 |
| 2012/0275715 A1* | 11/2012 | Okuyama et al. | ............. | 382/232 |

FOREIGN PATENT DOCUMENTS

| | | |
|---|---|---|
| JP | A-2006-033161 | 2/2006 |
| JP | A-2008-242850 | 10/2008 |
| JP | A-2009-003765 | 1/2009 |

\* cited by examiner

*Primary Examiner* — Sean Motsinger
(74) *Attorney, Agent, or Firm* — Oliff PLC

(57) ABSTRACT

An image data processing apparatus includes a configuration selecting unit, a loading unit, and a controller. The configuration selecting unit determines types of image characteristics of individual processing units in image data and selects plural pieces of circuit configuration data for individual processing units. The loading unit predicts a predetermined number of pieces of circuit configuration data in descending order of the likelihood of being selected for the processing unit currently being processed, and loads, before selection of the circuit configuration data for the processing unit, the predetermined number of pieces of configuration data into a circuit configuration memory for a reconfigurable circuit. If the selected circuit configuration data has already been loaded, the controller causes the circuit configuration to be reconfigured. If the selected circuit configuration data has not been loaded, the controller causes the selected circuit configuration data to be loaded and the circuit configuration to be reconfigured.

5 Claims, 7 Drawing Sheets

FIG. 3

| CONFIGURATION DATA | A | B | C | D | ... | Z |
|---|---|---|---|---|---|---|
| FREQUENCY | 1 | 5 | 16 | 135 | ... | 24 |
| ORDER | 24 | 7 | 5 | 1 | ... | 2 |

FIG. 4

| MEMORY NUMBER | 1 | 2 | 3 |
|---|---|---|---|
| CONFIGURATION DATA | D | Z | B |

FIG. 7

| BLOCK NUMBER | 1 | 2 | 3 | 4 | ... | N |
|---|---|---|---|---|---|---|
| CONFIGURATION DATA | A | A | D | D | ... | A |

IMAGE DATA PROCESSING APPARATUS, IMAGE DATA PROCESSING METHOD, AND COMPUTER READABLE MEDIUM

CROSS-REFERENCE TO RELATED APPLICATIONS

This application is based on and claims priority under 35 USC 119 from Japanese Patent Application No. 2011-102130 filed Apr. 28, 2011.

BACKGROUND

The present invention relates to an image data processing apparatus, an image data processing method, and a computer readable medium.

SUMMARY

According to an aspect of the invention, there is provided an image data processing apparatus including a configuration selecting unit, a loading unit, and a controller. The configuration selecting unit determines types of image characteristics of individual processing units in image data and selects plural pieces of circuit configuration data for individual processing units on the basis of the determined types of image characteristics. The loading unit predicts, on the basis of information on selection results of circuit configuration data obtained by the configuration selecting unit for processing units processed prior to the processing unit currently being processed among the processing units in the image data, a predetermined number of pieces of circuit configuration data in descending order of the likelihood of being selected for the processing unit currently being processed among the plural pieces of circuit configuration data, and loads, before the configuration selecting unit selects the circuit configuration data for the processing unit currently being processed, the predicted predetermined number of pieces of configuration data into a circuit configuration memory for a reconfigurable circuit. The controller performs control in such a manner that, in a case where the circuit configuration data selected by the configuration selecting unit for the processing unit currently being processed has already been loaded into the circuit configuration memory, the circuit configuration of the reconfigurable circuit is reconfigured in accordance with the selected circuit configuration data, and that, in a case where the circuit configuration data selected by the configuration selecting unit for the processing unit currently being processed has not been loaded into the circuit configuration memory, the selected circuit configuration data is loaded into the circuit configuration memory, and the circuit configuration of the reconfigurable circuit is reconfigured in accordance with the loaded, selected circuit configuration data.

BRIEF DESCRIPTION OF THE DRAWINGS

Exemplary embodiments of the present invention will be described in detail based on the following figures, wherein:

FIG. 3 illustrates an example of history data in a reconfiguration history manager;

FIG. 4 illustrates an example of data in a configuration memory manager;

FIG. 7 illustrates an example of history data in a reconfiguration history manager according to an exemplary modification of the present invention.

DETAILED DESCRIPTION

An image data processing apparatus according to an exemplary embodiment of the present invention performs image data compression and other image processes for image data, for example, such as images to be printed, using a dynamic reconfigurable processor (DRP).

Figure 1:
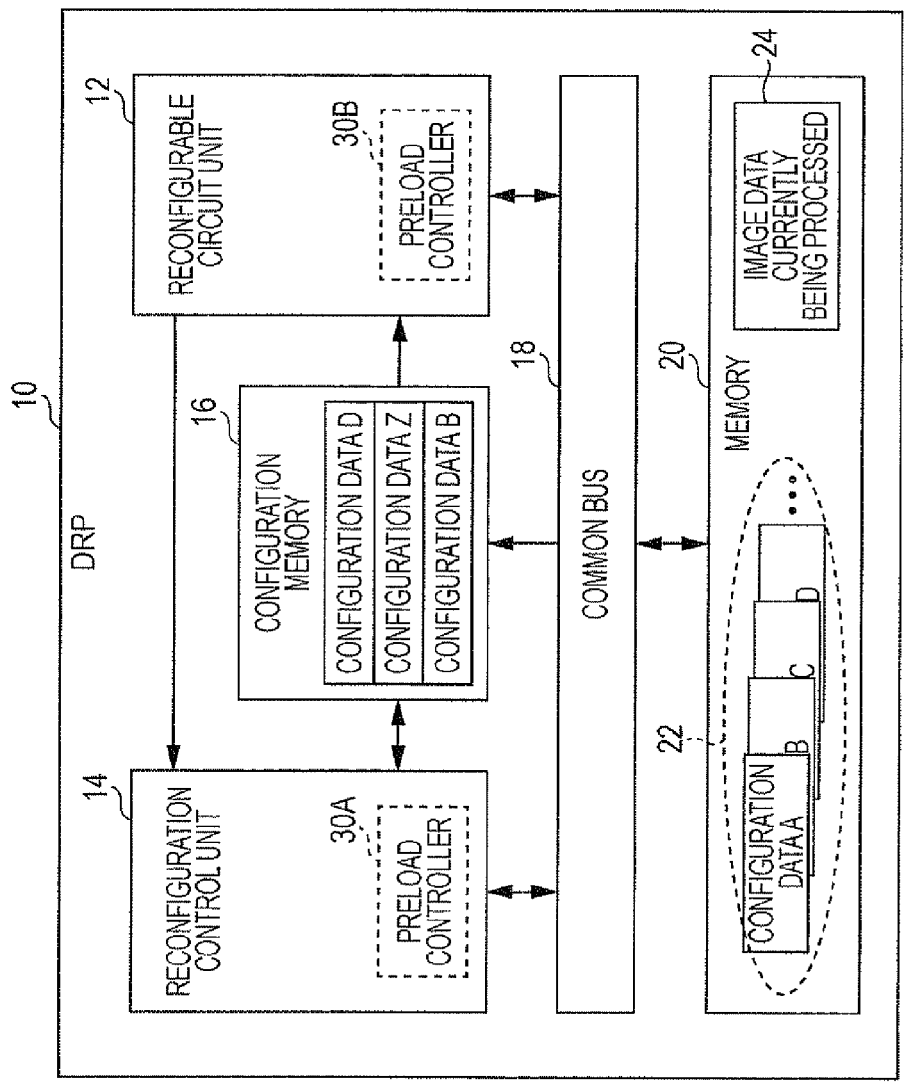
FIG. 1 illustrates an example of the hardware configuration of an apparatus according to an exemplary embodiment of the present invention.

FIG. 1 illustrates an example of the hardware configuration of the image data processing apparatus according to this exemplary embodiment. In this example, the image data processing apparatus includes a DRP 10.

The DRP 10 is a processor capable of dynamically (for example, during one clock period) changing (reconfiguring) the configuration of internal logic circuits. A digital application processor/distributed network architecture (DAP/DNA) architecture processor introduced, for example, in Japanese Unexamined Patent Application Publication No. 2009-2765 is an example of the DRP 10. Obviously, however, the DRP 10 is not limited to this. The DRP 10 includes a reconfigurable circuit unit 12, a reconfiguration control unit 14, and a configuration memory 16.

The reconfigurable circuit unit 12 includes a large number of logic circuit elements. The reconfigurable circuit unit 12 is capable of dynamically reconfiguring functional parameters for the logic circuit elements and the connection relations among the logic circuit elements.

Various existing circuits or circuits for which development is expected to proceed, such as a DNA introduced, for example, in Japanese Unexamined Patent Application Publication No. 2009-3765, may be used as the reconfigurable circuit unit 12. For example, a DNA is an array including a large number of logic circuit elements called processer elements (PEs) and is capable of rapidly (for example, during one clock period) reconfiguring the connection configuration among the PEs in accordance with configuration data.

The reconfiguration control unit 14 is a functional module that controls the operation of the entire DRP 10 including the reconfigurable circuit unit 12. For example, the reconfiguration control unit 14 is implemented when a general-purpose processor executes a control program. By controlling the connection relations among the logic circuit elements within the reconfigurable circuit unit 12, the reconfiguration control unit 14 reconfigures a circuit for data processing in the reconfigurable circuit unit 12. Furthermore, the reconfiguration control unit 14 performs control for supplying input data to the circuit reconfigured in the reconfigurable circuit unit 12 in accordance with an instruction from a host system (a host system that issues a request for processing to the DRP 10) and supplying output data from the circuit back to the host system. In the case where the DAP/DNA architecture introduced in Japanese Unexamined Patent Application Publication No. 2009-3765 is adopted in this exemplary embodiment, the reconfiguration control unit 14 is implemented when a general-purpose processor core called a DAP executes a control program (however, this is merely an example).

The reconfiguration of the circuit within the reconfigurable circuit unit 12 is performed in accordance with configuration data stored in the configuration memory 16. The configuration data is data which defines the circuit configuration of the reconfigurable circuit unit 12. Plural pieces of configuration data are stored in the configuration memory 16. When one of the plural pieces of configuration data stored in the configuration memory 16 is selected and becomes active, reconfiguration based on the circuit configuration defined by the selected configuration data is performed in the reconfigurable circuit unit 12. The number of pieces of configuration data that can be stored in the configuration memory 16 is limited. In the example illustrated in FIG. 2, for example, at most thee pieces of configuration data can be stored in the configuration memory 16 (however, this is merely an example). The DRP 10 has a function of adding new configuration data to the configuration memory 16, replacing configuration data stored in the configuration memory 16 by different configuration data, and deleting configuration data from the configuration memory 16, in accordance with instructions from the host system.

The reconfigurable circuit unit 12 and the reconfiguration control unit 14 are connected to a rapid-access memory 20, such as a random-access memory, via a common bus 18. The memory 20 is a storage device used as a work area for the reconfiguration control unit 14 and the reconfigurable circuit unit 12. For example, plural pieces of configuration data 22, image data 24 currently being processed, which is supplied from a host system, and the like are stored in the memory 20. The number of pieces of configuration data 22 stored in the memory 20 is larger than the number of pieces of configuration data that can be stored in the configuration memory 16. A limited number of pieces of configuration data selected from the configuration data 22 stored in the memory 20 are loaded into the configuration memory 16. Although the memory 20 is contained in the DRP 10 in the example illustrated in FIG. 1, this is merely an example. The reconfiguration control unit 14 and the reconfigurable circuit unit 12 may access a memory provided outside of the DRP 10.

In this exemplary embodiment, image data currently being processed is divided into blocks each having a predetermined size, and the DRP 10 performs an image process on the blocks in a raster scanning order. Each of the blocks includes plural pixels and has a size of about several pixels by several pixels. Here, it is assumed that an image process (for example, compression coding) is performed on image data. Even for a single image process, since the image properties (characteristics) of blocks in an image are different from each other, the details of the process are changed in accordance with the image characteristics of the individual blocks. For the case of compression coding, the process is performed in different ways corresponding to the characteristics of the individual blocks. For example, G4 compression, which is used for facsimile and the like, is used for a block determined to be a character block, and JPEG compression is used for a block determined to be a photograph block. In the apparatus according to this exemplary embodiment, by changing the circuit configuration inside the DRP 10 in accordance with the image characteristics of the individual blocks, an image process appropriate for the image characteristics of the individual blocks is achieved. Here, when the types of image characteristics are subdivided into some groups and processing corresponding to the subdivided groups is performed, the number of types of circuit configuration (the number of pieces of configuration data) exceeds the number of pieces of configuration data that can be stored in the configuration memory 16. Thus, all the pieces of configuration data that might be used are prepared in the memory 20, and required pieces of configuration data are loaded into the configuration memory 16 when necessary.

In this exemplary embodiment, required configuration data is predicted on the basis of historical results, and configuration data that is highly likely to be required for processing for a certain block is loaded, on the basis of the prediction, into the configuration memory 16 in advance, that is, prior to determination of the type of the image characteristics of the block. Accordingly, in this exemplary embodiment, by loading performed in advance on the basis of prediction, maintenance of the configuration memory 16 is performed in such a manner that configuration data that is highly likely to be required is prepared in the configuration memory 16 before the start of processing for each block. Hereinafter, such loading performed in advance will be referred to as "preloading". Since preloading is performed during a period in which other blocks are being processed in the DRP 10, the time required for preloading is substantially obscured. In the case where prediction is incorrect, an extra time is required for loading correct configuration data. However, when the hitting ratio of prediction is high enough, since the time required for preloading is obscured, the total loading time is expected be reduced.

A portion that performs control for preloading is indicated as a preload controller 30A or 30B, which is expressed as a broken-line block. Both the preload controllers 30A and 30B are expressed as broken-line blocks since only one of the preload controllers 30A and 30B needs to be provided. That is, as the apparatus configuration of this exemplary embodiment, two types of configuration, a configuration in which the preload controller 30A is provided in the reconfiguration control unit 14 and a configuration in which the preload controller 30B is provided in the reconfigurable circuit unit 12, are possible.

Figure 2:
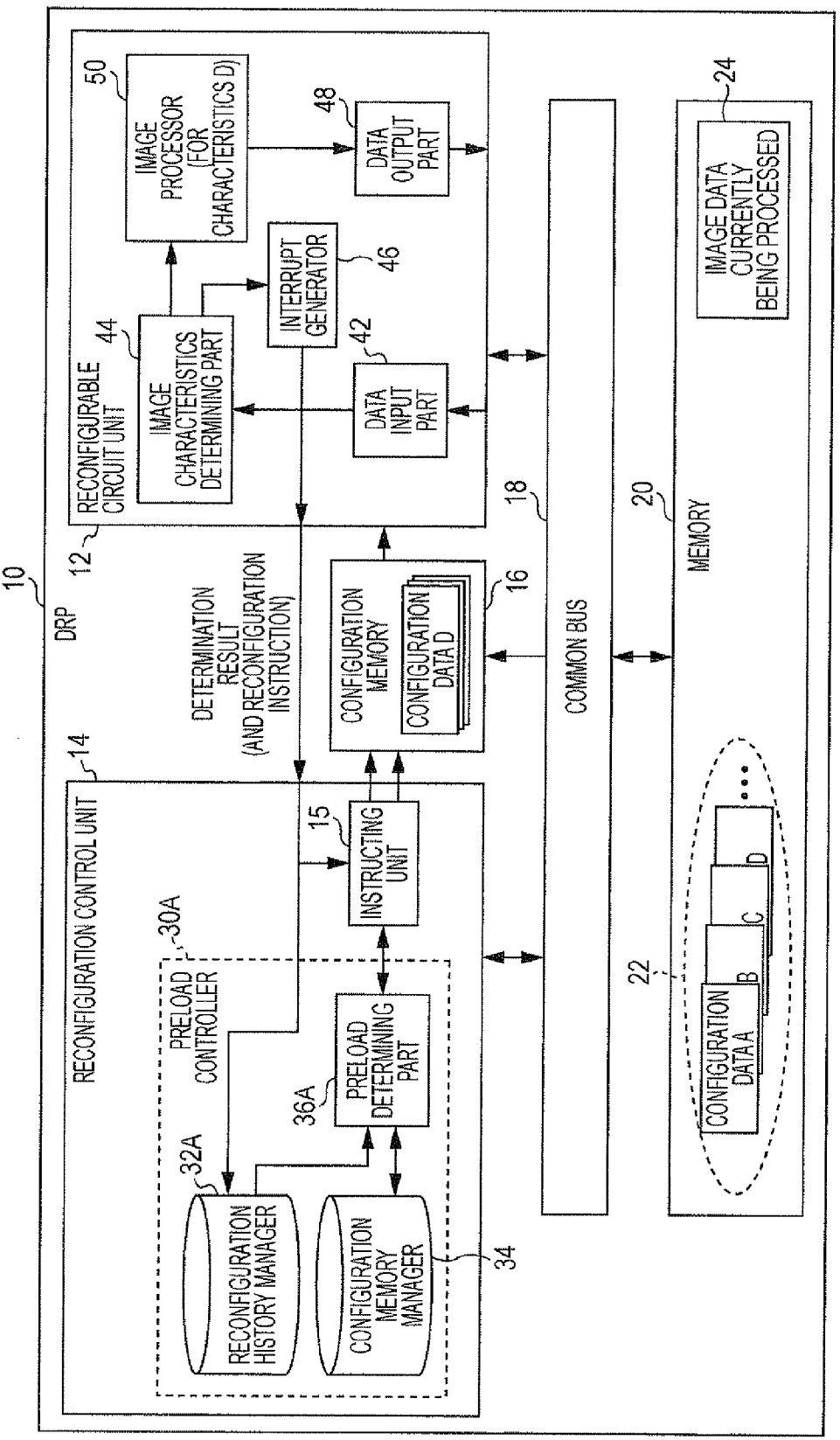
FIG. 2 illustrates an example of the internal configuration of the apparatus according to the exemplary embodiment.

FIG. 2 illustrates an example of the internal configuration of the DRP 10 in the case where the preload controller 30A is provided in the reconfiguration control unit 14.

In the example illustrated in FIG. 2, a data input part 42, an image characteristics determining part 44, an interrupt generator 46, a data output part 48, and an image processor 50 are reconfigured in the reconfigurable circuit unit 12. The data input part 42, the image characteristics determining part 44, the interrupt generator 46, the data output part 48, and the image processor 50, which are functional modules, are each implemented by combining circuit elements in the reconfigurable circuit unit 12. The internal configuration of the reconfigurable circuit unit 12 illustrated in FIG. 2 is based on one of the plural pieces of configuration data 22 stored in the configuration memory 16. In this example, each of the plural pieces of configuration data 22 stored in the configuration memory 16 defines, for example, a circuit configuration corresponding to a type of image characteristics for a certain image process (for example, compression coding). The circuit configuration of the reconfigurable circuit unit 12 illustrated in FIG. 2 corresponds to "characteristics D", which is one of plural types of image characteristics, and is defined by configuration data D. The data input part 42, the image characteristics determining part 44, the interrupt generator 46, and the data output part 48 are common circuits that do not depend on the type of image characteristics. Only the image processor 50 is a circuit unique to each type of image characteristics. In the configuration memory 16, not only the plural pieces of configuration data 22 for individual types of image characteristics for a certain image process (for example, image compression), but configuration data for other one or more image processes (for example, color space conversion) may also be stored.

In the circuit configuration of the reconfigurable circuit unit 12 illustrated in FIG. 2, the data input part 42 is a functional module that receives from the memory 20 an input of the image data 24 currently being processed. Inputting of an image is performed in units of blocks each having a predetermined size (for example, m pixels by n pixels, where "m" and "n" each represent a natural number). The image characteristics determining part 44 receives a block of an image from the data input part 42 and determines the type of image characteristics of the block. That is, the image characteristics determining part 44 determines the type of image characteristics that best matches the image of the block from among plural types of image characteristics corresponding to the individual pieces of configuration data 22. Data indicating the image characteristics based on the determination result is supplied to the interrupt generator 46. The interrupt generator 46 informs the reconfiguration control unit 14 of the determination result data received from the image characteristics determining part 44. The interrupt generator 46 also compares the determination result of the type of image characteristics of the immediately previous block, which is stored in the interrupt generator 46, with the determination result currently received from the image characteristics determining part 44. If these determination results differ from each other, the interrupt generator 46 issues an interrupt signal (reconfiguration instruction) to the reconfiguration control unit 14. If these determination results are the same, the interrupt generator 46 does not issue an interrupt signal.

The image processor 50 has a circuit configuration for an image process for a specific type of image characteristics (in the example illustrated in FIG. 2, characteristics D corresponding to the configuration data D). The image processor 50 receives, via the image characteristics determining part 44, a block of an image currently being processed from the data input part 42, and processes data of the block in accordance with the circuit configuration. Data of the result of the process performed by the image processor 50 is written to the memory 20, from the data output part 48 via the common bus 18.

An example of the internal functional configuration of the reconfiguration control unit 14 will now be explained. As illustrated in FIG. 2, the reconfiguration control unit 14 includes an instructing unit 15 and the preload controller 30A.

The instructing unit 15 is a functional module that issues to the configuration memory 16 an instruction for loading configuration data and an instruction for reconfiguring the reconfigurable circuit unit 12.

In the case where the instructing unit 15 receives a reconfiguration instruction from the interrupt generator 46 of the reconfigurable circuit unit 12, for example, the instructing unit 15 refers to a configuration memory manager 34 and determines whether or not configuration data of a circuit configuration to be reconfigured exists in the configuration memory 16. The circuit configuration to be reconfigured may be indicated in the data of the reconfiguration instruction. Alternatively, the circuit configuration to be reconfigured may be identified on the basis of the determination result regarding the image characteristics notified by the interrupt generator 46. If the configuration data of the circuit configuration to be reconfigured exists in the configuration memory 16, the instructing unit 15 instructs the configuration memory 16 to cause the configuration data to become active (that is, reconfiguration of the circuit configuration is performed in accordance with the configuration data). If the configuration data of the circuit configuration to be reconfigured does not exist in the configuration memory 16, the instructing unit 15 instructs the configuration memory 16 to load the configuration data and to cause the loaded configuration data to become active. The above-described operation of the instructing unit 15 in the case where a reconfiguration instruction is received is similar to the operation performed by a known reconfiguration controller.

Furthermore, when receiving a preload instruction regarding configuration data from the preload controller 30A, the instructing unit 15 instructs the configuration memory 16 to load the configuration data from the memory 20.

The preload controller 30A includes a reconfiguration history manager 32A, the configuration memory manager 34, and a preload determining part 36A.

The reconfiguration history manager 32A stores histories of determination results obtained by the image characteristics determining part 44 for individual blocks in the image data 24 currently being processed, that is, history data indicating the correspondence between the individual blocks and configuration data used for processes for the individual blocks. The reconfiguration history manager 32A updates the history data in accordance with the determination result regarding the image characteristics received from the interrupt generator 46 in the reconfigurable circuit unit 12.

FIG. 3 illustrates an example of the details of history data. In the history data illustrated in FIG. 3, for each of the plural pieces of configuration data 22, information on the frequency of previous use of the configuration data and the order of the frequency in the plural pieces of configuration data 22. The frequency of previous use is obtained by accumulation through sequential processing of image data.

The configuration memory manager 34 stores information on which configuration data is stored in the configuration memory 16. For example, the configuration memory manager 34 may update data in the configuration memory manager 34 in accordance with a load instruction issued from the instructing unit 15 to the configuration memory 16.

FIG. 4 illustrates an example of the details of data in the configuration memory manager 34. In this example, the number of a storage area (referred to as a "memory number") for a corresponding piece of configuration data in the configuration memory 16 is associated with identification information on the configuration data stored in the storage area.

The preload determining part 36A determines which configuration data is to be preloaded into the configuration memory 16, in accordance with the data in the reconfiguration history manager 32A. The instructing unit 15 loads the configuration data determined by the preload determining part 36A into the configuration memory 16.

An example of the flow of a process performed by the DRP 10 illustrated in FIG. 2 will now be explained with reference to FIG. 5. In this example, when an image process for the image data 24 currently being processed is started, initialization is performed (step S10). In the initialization processing, the instructing unit 15 of the reconfiguration control unit 14 loads into the configuration memory 16 configuration data specified as an initial value from among the plural pieces of configuration data 22. By this initial loading, plural pieces of configuration data are stored in corresponding storage areas in the configuration memory 16. Then, in accordance with a predetermined one of the loaded plural pieces of configuration data, the reconfigurable circuit unit 12 is reconfigured. Furthermore, in the initialization processing, history data in the reconfiguration history manager 32A is reset. That is, the frequency regarding each piece of configuration data is set to 0, and the order is nullified. This initialization processing is performed, for example, for each predetermined unit of image data (for example, in units of pages).

After the initialization (step S10), the reconfiguration control unit 14 instructs the reconfigurable circuit unit 12 to start processing for the image data 24. Then, the data input part 42 configured in the reconfigurable circuit unit 12 receives the first block of the image data 24 from the memory 20 (step S12). Then, the image characteristics determining part 44 determines which type of image characteristics matches the received block (that is, which configuration data represents the circuit configuration to be used for processing for the block) (step S14). For example, the determination result is reported to the reconfiguration control unit 14 via the interrupt generator 46. The interrupt generator 46 compares the determination result regarding the type of image characteristics of the immediately previous block with the determination result currently received from the image characteristics determining part 44 (step S16). For the case of the first block, the type of image characteristics corresponding to the configuration data that is currently in an active mode may be set as the determination result of the immediately previous block (in this case, the determination result in step S16 is affirmative, that is, "same").

If it is determined in step S16 that the determination result of the immediately previous block and the determination result of the current block are the same, the process proceeds to step S22. In step S22, the data of the current block is supplied to the image processor 50, and the image processor 50 performs an image process. Then, if it is determined in step S24 that there is any unprocessed block remaining in the image data 24, the process returns to step S12, in which the data input part 42 receives the next block.

If it is determined in step S16 that the determination result of the immediately previous block and the determination result of the current block differ from each other, the interrupt generator 46 issues to the reconfiguration control unit 14 a reconfiguration instruction for performing reconfiguration based on the circuit configuration corresponding to the current determination result. When the reconfiguration control unit 14 receives the reconfiguration instruction, the instructing unit 15 refers to the configuration memory manager 34 and determines whether or not the configuration data corresponding to the current determination result exists in the configuration memory 16 (step S18). If the configuration data corresponding to the current determination result exists in the configuration memory 16, the instructing unit 15 instructs the configuration memory 16 to cause the configuration data corresponding to the reconfiguration instruction to become active (step S20). Accordingly, the circuit configuration in the reconfigurable circuit unit 12 is changed so as to include an image processor 50 corresponding to the type of image characteristic of the current block during, for example, one clock period (a time of the order of several nanoseconds). Then, the data of the current block is supplied to the image processor 50, and the image processor 50 performs an image process (step S22). If it is determined in step S24 that there is any unprocessed block remaining in the image data 24, the process returns to step S12, in which the data input part 42 receives the next block.

The case where it is determined in step S18 that the configuration data corresponding to the current determination result does not exist in the configuration memory 16 means that preloading performed in accordance with the prediction based on the historical results under the preload control (steps S32 to S38), which will be described later, is unsuccessful. In this case, the instructing unit 15 refers to the reconfiguration history manager 32A and the configuration memory manager 34 and obtains the configuration data that is in the last place in the order of frequency (that is, the configuration data with the lowest frequency of previous use) among the plural pieces of configuration data in the configuration memory 16. Then, the configuration data corresponding to the current determination result is loaded into a storage area for the configuration data in the last place in the order of frequency in the configuration memory 16 (step S26). That is, in the configuration memory 16, basically, a predetermined number of pieces of configuration data (that is, the number of pieces of configuration data that can be stored in the configuration memory 16, in the example illustrated in FIG. 2, three pieces of configuration data) are stored in descending order from the highest frequency of previous use indicated in the history data in the reconfiguration history manager 32A, and the configuration data in the last place in the order of frequency (that is, the configuration data with the lowest frequency of previous use) is replaced by the configuration data corresponding to the type of characteristics of the block currently being processed. Then, the instructing unit 15 instructs the configuration memory 16 to cause the newly loaded configuration data to become active (step S28). Accordingly, the circuit configuration in the reconfigurable circuit unit 12 is changed so as to include an image processor 50 corresponding to the type of image characteristics of the current block. Then, the data of the current block is supplied to the image processor 50, and the image processor 50 performs an image process (step S22). If it is determined in step S24 that there is any unprocessed block remaining in the image data 24, the process returns to step S12, in which the data input part 42 receives the next block. Regarding the circuit configuration of the reconfigurable circuit unit 12, only about one clock period (for example, several nanoseconds) is required for switching the present configuration to the configuration corresponding to another piece of configuration data existing in the configuration memory 16. Meanwhile, when prediction is incorrect, about several microseconds is required for loading configuration data in step S26. After the configuration data corresponding to the current block is registered in the configuration memory 16 in step S26, the instructing unit 15 replaces identification information on the configuration data with the lowest frequency of previous use among the plural pieces of data stored in the configuration memory manager 34 by identification information on the newly loaded configuration data (step S30).

The processing steps S10 to S30 described above are repeated in a raster scanning order from the first block to the last block of a piece of image data (for example, an image of one page).

After the determination in step S14, the reconfiguration history manager 32A receives the determination result, updates the value of the frequency of previous use of the configuration data corresponding to the determination result (for example, increments the value by one) in the history data (see FIG. 3) (step S32), and updates the order of the frequency of previous use of individual pieces of configuration data in accordance with the update of the value of the frequency of previous use (that is, sorting is performed in descending order of the frequency of previous use) (step S34). Then, the preload determining part 36A determines whether or not the order of a predetermined number of pieces of configuration data with higher frequencies of previous use in the history data (that is, the number of pieces of configuration data stored in the configuration memory 16, in the example illustrated in FIG. 2, three pieces of configuration data) has been changed from the order before updating (step S36). If the order has been changed, configuration data newly added to the predetermined number of pieces of configuration data with higher frequencies of previous use is loaded (preloaded) in such a manner that the configuration data with the lowest frequency of previous use in the configuration memory 16 is replaced by the newly added configuration data (step S38). In the case where the circuit configuration of the reconfigurable circuit unit 12 is reconfigured on the basis of the configuration data with the lowest frequency of previous use in the configuration memory 16 and the image process is performed for the image data of the block by the reconfigured circuit configuration at the time when the determination in step S36 is performed, the preloading in step S38 may be performed after the image process is completed. If the order of configuration data with higher frequencies of previous use in the history data has not been changed, the processing of step S38 is not performed.

As described above, by the processing steps S32 to S38, a predetermined number of pieces of configuration data are stored in descending order of the frequency of previous use in the configuration memory 16. The higher the frequency of previous use of a certain piece of configuration data is, the more likely the certain piece of configuration data is to be used for the next block. Thus, the processing steps S32 to S38 may be processing for preloading into the configuration memory 16 configuration data with a higher likelihood of being used for the next block among plural pieces of configuration data. The processing steps S32 to S38 are performed after step S14, in particular, during an image process performed for a block of image data by the reconfigurable circuit unit 12 in step S22, in parallel with the image process. Accordingly, at least part of the time required for the processing of steps S32 to S38 (in some cases, all the time required for the processing) is hidden in the time from the determination in step S14 to the completion of the image process for the corresponding block.

As an exemplary modification, after step S34, it may be determined whether or not the total value of the frequencies of previous use of all the pieces of configuration data in the reconfiguration history manager 32A has reached a predetermined threshold (step S40), and the history data in the reconfiguration history manager 32A may be initialized if the total value of the frequencies of previous use has reached the predetermined threshold (step S42). In the initialization processing, for example, the values of the frequencies of previous use of all the pieces of configuration data may be set to 0. The threshold used in step S40 may be, for example, the number of blocks in a predetermined number of lines in image data of one page currently being processed. That is, in this example, during the image process for image data of one page, history data is reset for a predetermined number of lines. This is because the types of image content (for example, text, photographs, drawings, etc.) may be different among portions, such as an upper portion, a middle portion, and a lower portion. For example, during the period in which a portion including a large amount of text is being processed, the frequencies of previous use of some pieces of configuration data corresponding to text in the history data are increased. If a large part of the next portion is occupied by a photograph, the frequencies of previous use for the previous portion including a large amount of text affect the frequencies of previous use for the next portion and the hitting ratio of prediction of preloading (that is, the ratio of the determination result in step S18 being "affirmative") is thus reduced. Therefore, in this example, one page is divided into plural portions and the frequencies of previous use in history data are reset for the individual portions in steps S40 to S42. Accordingly, the tendency of the image content of a portion does not affect preload control for other portions.

Figure 5:
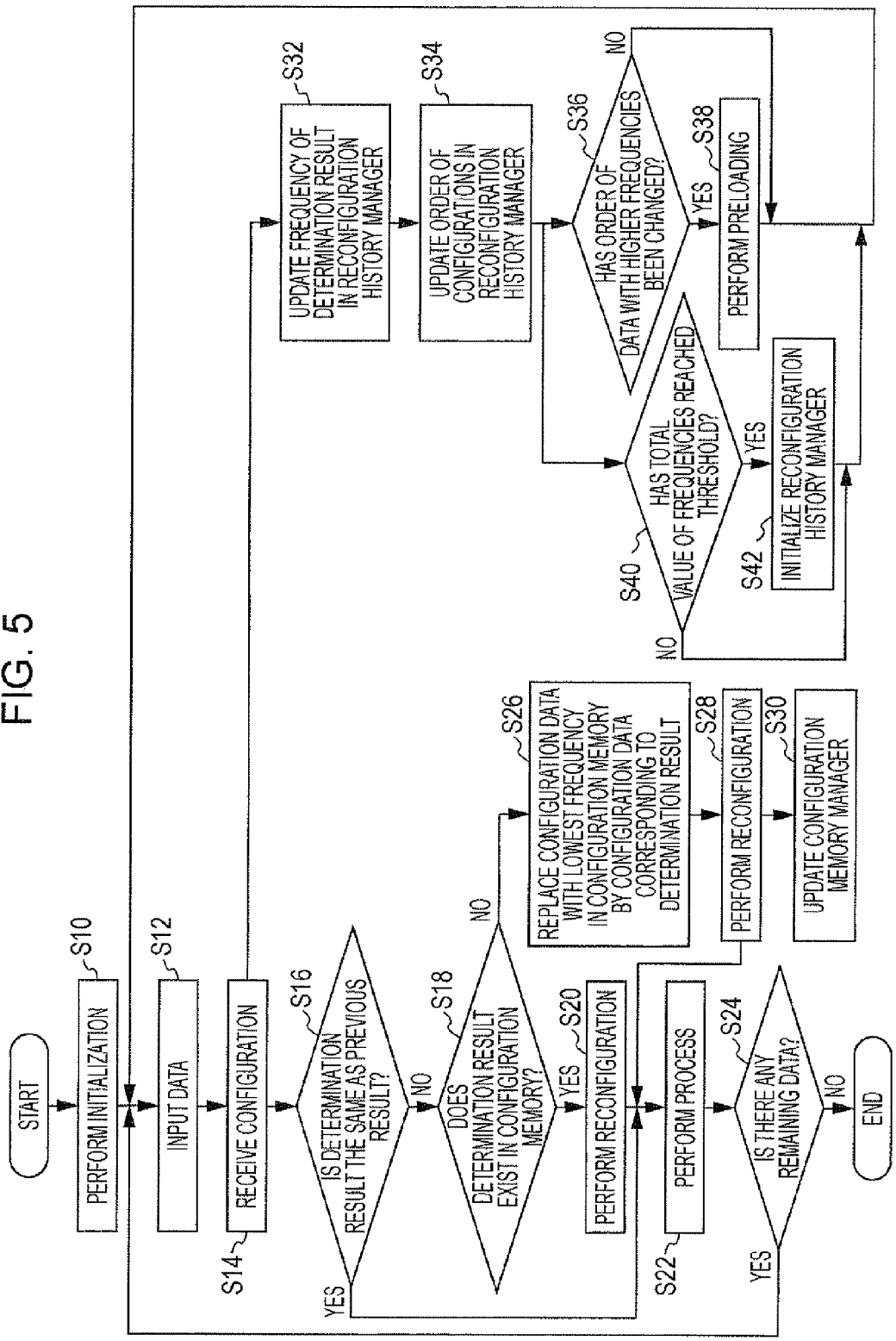
FIG. 5 is a flowchart illustrating an example of the flow of a process performed in the exemplary embodiment.

In FIG. 5, the flow of steps S40 to S42 and the flow of steps S36 to S38 are expressed in a parallel manner. However, the processing of steps S40 to S42 may be performed prior to the processing of step S36. In this case, if the initialization in step S42 is performed, the processing of steps S36 and S38 are not necessarily performed. The processing of steps S40 to S42 are performed in parallel with the image process performed in step S22.

Figure 6:
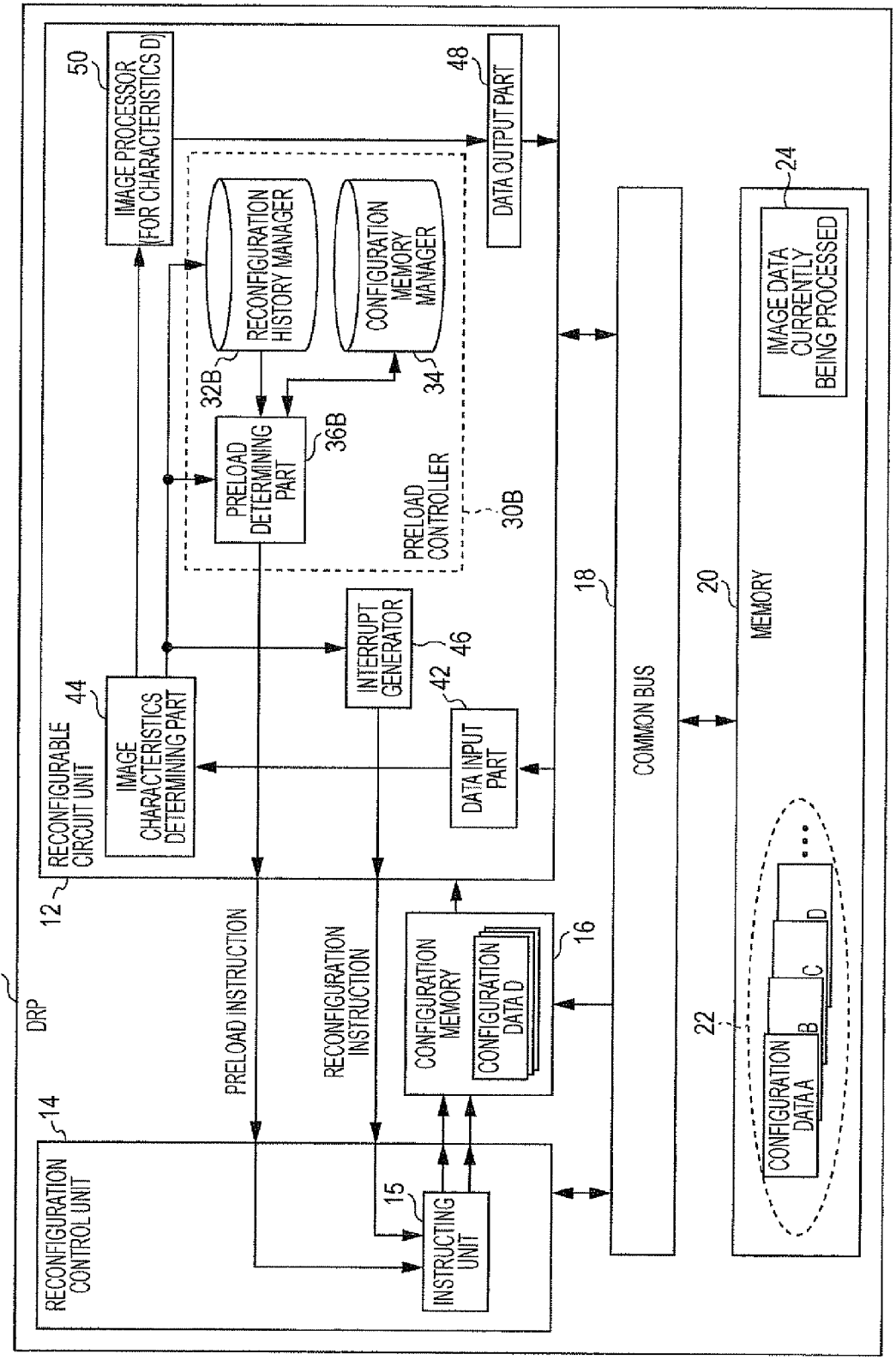
FIG. 6 illustrates another example of the internal configuration of the apparatus according to the exemplary embodiment.

In the example explained above with reference to FIGS. 2 to 5, the preload controller 30A is provided in the reconfiguration control unit 14. Next, an example in which the preload controller 30B having a function similar to that of the preload controller 30A is configured in the reconfigurable circuit unit 12 will be explained with reference to FIG. 6. In FIG. 6, elements similar to those explained with reference to FIG. 2 are referred to with the same reference numerals and the explanations of those similar elements will be omitted.

In the example illustrated in FIG. 6, the circuit of the preload controller 30B is configured in the reconfigurable circuit unit 12. The preload controller 30B includes a circuit configuration including a reconfiguration history manager 32B, a configuration memory manager 34, and a preload determining part 36B. The functions of the reconfiguration history manager 32B, the configuration memory manager 34, and the preload determining part 36B may be similar to the functions of the reconfiguration history manager 32A, the configuration memory manager 34, and the preload determining part 36A illustrated in FIG. 2, respectively. That is, the reconfiguration history manager 32B stores history data indicating the frequency of previous use and the order of the frequency of previous use of each of plural pieces of configuration data, and updates the frequency of previous use and the order of the frequency of previous use of individual pieces of configuration data in the history data in accordance with the determination result obtained by the image characteristics determining part 44. The configuration memory manager 34 stores identification information on individual pieces of configuration data stored in the configuration memory 16 (see FIG. 4). In the case where it is determined, in accordance with the determination result obtained by the preload determining part 36B and an interrupt instruction issued from the interrupt generator 46, that the combination of plural pieces of configuration data in the configuration memory 16 has been changed, the combination of identification information on the stored configuration data is updated in accordance with the change.

In the case where the combination of a predetermined number of pieces of configuration data with higher frequencies of previous use in the history data in the reconfiguration history manager 32B (the number of pieces of configuration data stored in the configuration memory 16) has been changed in accordance with the determination result obtained by the image characteristics determining part 44, the preload determining part 36B issues to the reconfiguration control unit 14 a preload instruction for replacing the configuration data with the lowest frequency of previous use in the configuration memory 16 by the configuration data newly added to the plural pieces of configuration data with higher frequencies of previous use. In accordance with the preload instruction, the instructing unit 15 of the reconfiguration control unit 14 preloads the configuration data newly added to the plural pieces of configuration data with higher frequencies of previous use into the configuration memory 16. In accordance with the preloading, the data in the configuration memory manager 34 is updated so as to reflect the data stored in the configuration memory 16. In the case where the determination result for a certain block obtained by the image characteristics determining part 44 is different from the determination result for the immediately previous block, the interrupt generator 46 instructs the reconfiguration control unit 14 to perform reconfiguration based on the configuration data corresponding to the current determination result. In accordance with the instruction, in the case where the configuration data corresponding to the current determination result exists in the configuration memory 16, the instructing unit 15 instructs the configuration memory 16 to cause the configuration data to become active. In the case where the configuration data corresponding to the current determination result does not exist in the configuration memory 16, the instructing unit 15 instructs the configuration memory 16 to load the configuration data into the storage area for the configuration data with the lowest frequency of previous use in the configuration memory 16 and to cause the loaded configuration data to become active.

The plural pieces of configuration data in the memory 20 each include data defining the circuit configuration of the preload controller 30B as well as the circuit configuration of the data input part 42, the image characteristics determining part 44, the interrupt generator 46, the data output part 48, and the image processor 50.

The flow of the process performed by the DRP 10 having the configuration illustrated in FIG. 6 may be similar to the flow of the process illustrated in FIG. 5.

Another example of preload control based on historical results will now be explained with reference to FIGS. 7 and 8.

Figure 8:
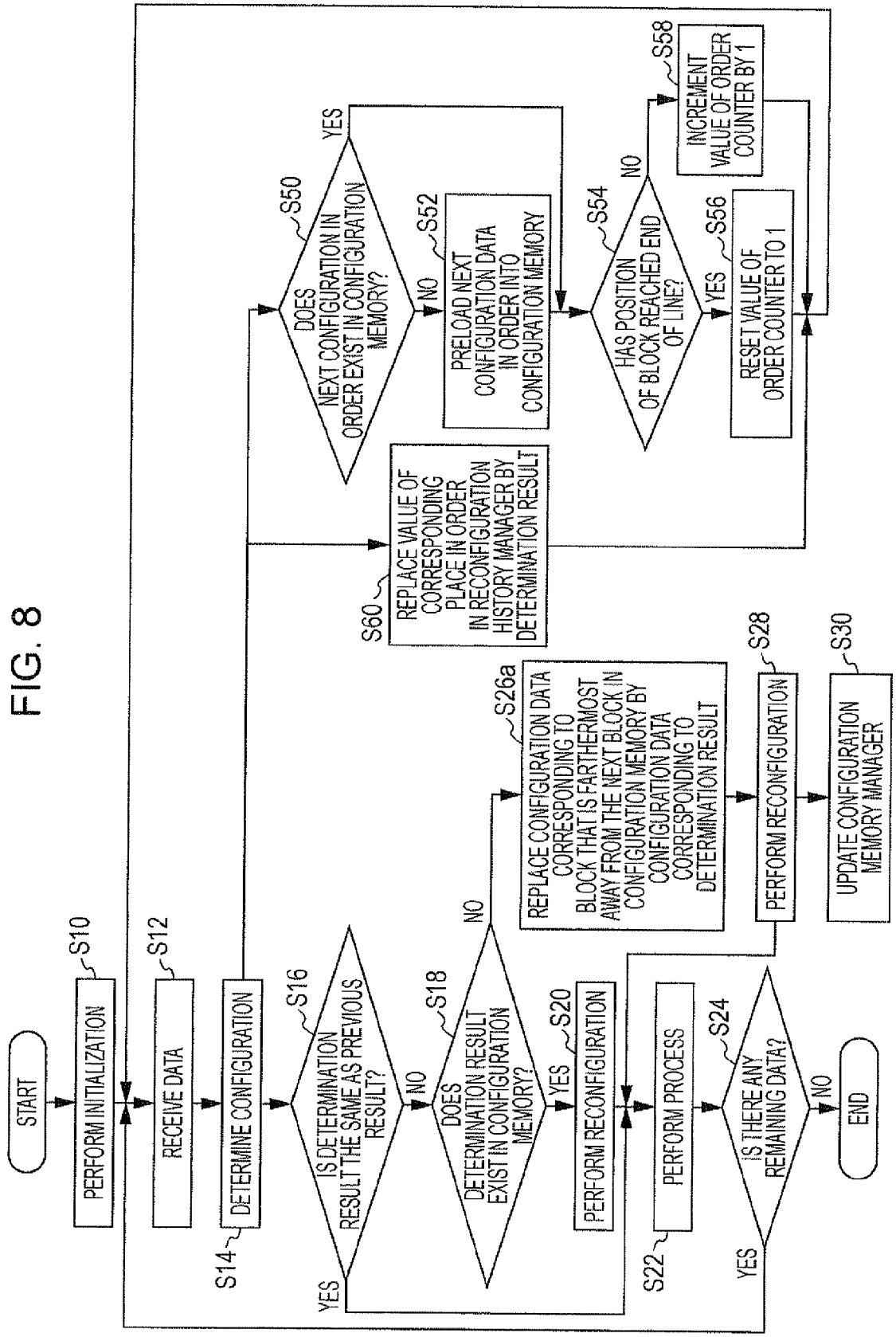
FIG. 8 is a flowchart illustrating an example of the flow of a process performed in the exemplary modification.

Roughly speaking, in an exemplary modification illustrated in FIGS. 7 and 8, a group of pieces of configuration data used for blocks adjacent to a block currently being processed in an image are stored in the configuration memory 16 before the start of the determination regarding the type of image characteristics of the block currently being processed is made. For example, configuration data used for the blocks immediately above and obliquely above the block currently being processed, from among blocks in a line (row) in which the block currently being processed is located in an image of one page, are preloaded into the configuration memory 16. Since the image characteristics of a block are likely to be similar to the image characteristics of neighboring blocks, the configuration data used for blocks near the block currently being processed is highly likely to be used for the block currently being processed. In this example, in the process proceeding in a raster scanning order, the types of configuration data used for previously processed blocks are stored. Then, configuration data used for blocks located in the vicinity of the block currently being processed is preloaded as configuration data that is highly likely to be used for the block currently being processed.

In this example, the history data stored in the reconfiguration history manager 32A or 32B is as illustrated in FIG. 7, unlike the example illustrated in FIG. 3. That is, the history data illustrated in FIG. 7 contains identification information on plural pieces of configuration data used for processing for individual blocks for one line (one line in the horizontal scanning direction) immediately before the line in which the block currently being processed is located. The term "line" means a group of blocks aligned along the horizontal scanning direction in raster scanning. That is, the height of a line is equivalent to the height of a block. The "block number" in FIG. 7 is a number indicating the position of a block along the horizontal scanning direction in raster scanning. The last number "N" indicates the number of blocks included in a line. Since the history data in FIG. 7 contains information on the line immediately before the line in which the block currently being processed is located, configuration data used for the blocks immediately above and adjacent to the block currently being processed in the image of one page is obtained from the history data. In this exemplary modification, the obtained configuration data used for the neighboring blocks is preloaded into the configuration memory 16.

The configuration of the DRP 10 in the exemplary modification illustrated in FIGS. 7 and 8 may be similar to the configuration illustrated in FIG. 2 or 6. An example of the flow of a process in this exemplary modification will now be explained with reference to FIG. 8. Although the flow of the process performed in the case of the apparatus configuration illustrated in FIG. 2 (the configuration in which the preload controller 30A is configured in the reconfiguration control unit 14) will be explained below, the process may be performed similarly in the case of the apparatus configuration illustrated in FIG. 6 (the configuration in which the preload controller 30B is configured in the reconfigurable circuit unit 12).

In the process illustrated in FIG. 8, the processing steps S10 to S24 are similar to those in the process illustrated in FIG. 5. In the example illustrated in FIG. 8, in the case where it is determined in step S18 that configuration data corresponding to the current block does not exist in the configuration memory 16, configuration data corresponding to the block that is located at the position in the image farthermost away from the position of the next block to be processed in the configuration memory 16 is replaced by the configuration data corresponding to the next block to be processed (step S26a). Since a block nearer to the block currently being processed is more likely to be similar to the block currently being processed, the block located farthermost away from the next block is comparatively less likely to be similar to the next block. Thus, in consideration of the next block, the processing of step S26a is performed. In the process illustrated in FIG. 8, an order counter indicating the order of the block currently being processed in a line in which the block currently being processed is located (the position in the line) is controlled. Thus, in identification information on plural pieces of configuration data for individual blocks in the line immediately before the line in which the block currently being processed is located, which is stored in the reconfiguration history manager 32A, configuration data having the block number the same as the number indicated by the counter is configuration data used for the block immediately above the block currently being processed. Among the plural pieces of configuration data in the configuration memory 16, for example, configuration data having the block number that is farthermost away from the block number of the block immediately above the block currently being processed may be replaced by the configuration data corresponding to the block currently being processed in step S26a. After loading in step S26a is performed, reconfiguration is performed in step S28 and the process proceeds to step S22, similarly to the process illustrated in FIG. 5. Then, in step S30, the configuration memory manager 34 is updated.

In the process illustrated in FIG. 8, after the processing of step S14, the preload determining part 36B refers to the configuration memory manager 34 and determines whether or not the configuration data at the next place in the order in the history data in the reconfiguration history manager 32B (see FIG. 7), that is, the configuration data corresponding to "the value indicated by the order counter+1", exists in the configuration memory 16 (step S50). If the configuration data at the next place in the order does not exist in the configuration memory 16, the preload determining part 36B instructs the instructing unit 15 to preload the configuration data into the configuration memory 16 (step S52). The destination of preloading may be configuration data in the configuration memory 16 corresponding to the block that is located farthermost away from the next block to be processed in the image, similarly to the destination of loading in step S26a. In accordance with the preloading, the data content in the configuration memory manager 34 is also updated. After preloading is performed, the process proceeds to step S54. If it is determined in step S50 that the configuration data at the next place in the order exists in the configuration memory 16, the process proceeds to step S54 without performing step S52.

In step S54, it is determined whether or not the position of the block indicated by the order counter has reached the end of one line in the horizontal scanning direction (that is, the maximum value N of the number). If the position of the block indicated by the order counter has not reached the end of one line in the horizontal scanning direction, the value of the order counter is incremented by one (step S58). If the position of the block indicated by the order counter has reached the end of one line in the horizontal scanning direction, the value indicated by the order counter is reset to 1 (step S56).

After the processing of step S14, the reconfiguration history manager 32A updates the history data stored in the reconfiguration history manager 32A. In this update processing, the identification number of the oldest piece of configuration data in the history data for the immediately previous line, that is, the identification number of the configuration data corresponding to the same place in the order as the block currently being processed is replaced by the identification number corresponding to the determination result obtained in step S14 (step S60).

Also in the process illustrated in FIG. 8, the processing steps S50 to S60 are performed during which the image process for a block currently being processed is being performed by the reconfigurable circuit unit 12.

In the process illustrated in FIG. 8, configuration data corresponding to the blocks immediately above and adjacent to the block currently being processed is stored in the configuration memory 16, and it is highly likely that the characteristics of the block currently being processed matches one of the plural pieces of stored configuration data.

In this exemplary modification, configuration data for blocks located in the vicinity of the block currently being processed may be stored in the configuration memory 16. The blocks located in the vicinity of the block currently being processed are not limited to the blocks exemplified above. For example, configuration data for the block immediately before the block currently being processed in the same line may be left in the configuration memory 16. Alternatively, configuration data used for the block immediately above the block currently being processed and the configuration data used for a block later in the order than the block immediately above the block currently being processed in the line immediately above the line in which the block currently being processed is located may be preloaded into the configuration memory 16.

The use histories of configuration data stored in the reconfiguration history manager 32A are not limited to configuration data for blocks in one line. The use histories of configuration data for blocks in one or more lines may be stored in the reconfiguration history manager 32A.

In this exemplary embodiment, one of the processes illustrated in FIGS. 5 and 8 may be selectively used in accordance with an image currently being processed. For example, for an image including only text, the process illustrated in FIG. 8 may be used. For an image including content other than text (for example, a photograph), the process illustrated in FIG. 5 may be used. Information on whether an image includes only text or content other than text may be obtained, for example, in accordance with analysis of page description language (PDL) data indicating the image performed by a host system from which the process for the image is requested to the DRP 10 or in accordance with a user instruction.

The function of the preload controller 30A or 30B exemplified above may be implemented, for example, as software in a host apparatus that controls the DRP 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data processing apparatus comprising:
a configuration selecting unit that determines types of image characteristics of individual processing units in image data and that selects a plurality of pieces of circuit configuration data for the individual processing units on the basis of the determined types of image characteristics;
a loading unit that predicts, on the basis of information on selection results of circuit configuration data obtained by the configuration selecting unit for processing units processed prior to the processing unit currently being processed among the processing units in the image data, a predetermined number of pieces of circuit configuration data in descending order of the likelihood of being selected for the processing unit currently being processed among the plurality of pieces of circuit configuration data, and that loads, before the configuration selecting unit selects the circuit configuration data for the processing unit currently being processed, the predicted predetermined number of pieces of configuration data into a circuit configuration memory for a reconfigurable circuit; and
a controller that performs control in such a manner that, in a case where the circuit configuration data selected by the configuration selecting unit for the processing unit currently being processed has already been loaded into the circuit configuration memory, the circuit configuration of the reconfigurable circuit is reconfigured in accordance with the selected circuit configuration data, and that, in a case where the circuit configuration data selected by the configuration selecting unit for the processing unit currently being processed has not been loaded into the circuit configuration memory, the selected circuit configuration data is loaded into the circuit configuration memory, and the circuit configuration of the reconfigurable circuit is reconfigured in accordance with the loaded, selected circuit configuration data,
wherein the loading unit stores selection results of a plurality of pieces of circuit configuration data obtained by the configuration selecting unit for individual processing units in at least one line that is immediately before a line in which the processing unit currently being processed is located, and loads into the circuit configuration memory the circuit configuration data corresponding to selection results for individual processing units that are located in the vicinity of the processing unit currently being processed among the selection results for the processing units stored in the loading unit as a predetermined number of pieces of circuit configuration data sorted in descending order of the likelihood of being selected for the processing unit currently being processed.

2. The image data processing apparatus according to claim 1, wherein the loading unit adds up selection results of a plurality of pieces of circuit configuration data obtained by the configuration selecting unit for individual processing units processed prior to the processing unit currently being processed among the processing units in the image data to obtain the frequencies of selection of the individual pieces of circuit configuration data, and determines that circuit configuration data with a higher frequency of selection is more likely to be selected for the processing unit currently being processed.

3. The image data processing apparatus according to claim 2, wherein every time the adding up of the selection results for a predetermined number of processing units in the image data is completed, the loading unit initializes the result of the adding up of the number of times of selection for each of the plurality of pieces of circuit configuration data.

4. An image data processing method comprising:
    determining types of image characteristics of individual processing units in image data and selecting a plurality of pieces of circuit configuration data for the individual processing units on the basis of the determined types of image characteristics;
    predicting, on the basis of information on selection results of circuit configuration data for processing units processed prior to the processing unit currently being processed among the processing units in the image data, a predetermined number of pieces of circuit configuration data in descending order of the likelihood of being selected for the processing unit currently being processed among the plurality of pieces of circuit configuration data, and loading, before selection of the circuit configuration data for the processing unit currently being processed, the predicted predetermined number of pieces of configuration data into a circuit configuration memory for a reconfigurable circuit;
    performing control in such a manner that, in a case where the circuit configuration data selected for the processing unit currently being processed has already been loaded into the circuit configuration memory, the circuit configuration of the reconfigurable circuit is reconfigured in accordance with the selected circuit configuration data, and that, in a case where the circuit configuration data selected for the processing unit currently being processed has not been loaded into the circuit configuration memory, the selected circuit configuration data is loaded into the circuit configuration memory, and the circuit configuration of the reconfigurable circuit is reconfigured in accordance with the loaded, selected circuit configuration data; and
    storing, in a loading unit, selection results of a plurality of pieces of circuit configuration data for individual processing units in at least one line that is immediately before a line in which the processing unit currently being processed is located, and loading into the circuit configuration memory the circuit configuration data corresponding to selection results for individual processing units that are located in the vicinity of the processing unit currently being processed among the selection results for processing units stored in the loading unit as a predetermined number of pieces of circuit configuration data sorted in descending order of the likelihood of being selected for the processing unit currently being processed.

5. A non-transitory computer readable medium storing a program causing a computer to execute a process comprising:
    determining types of image characteristics of individual processing units in image data and selecting a plurality of pieces of circuit configuration data for the individual processing units on the basis of the determined types of image characteristics;
    predicting, on the basis of information on selection results of circuit configuration data for processing units processed prior to the processing unit currently being processed among the processing units in the image data, a predetermined number of pieces of circuit configuration data in descending order of the likelihood of being selected for the processing unit currently being processed among the plurality of pieces of circuit configuration data, and loading, before selection of the circuit configuration data for the processing unit currently being processed, the predicted predetermined number of pieces of configuration data into a circuit configuration memory for a reconfigurable circuit;
    performing control in such a manner that, in a case where the circuit configuration data selected for the processing unit currently being processed has already been loaded into the circuit configuration memory, the circuit configuration of the reconfigurable circuit is reconfigured in accordance with the selected circuit configuration data, and that, in a case where the circuit configuration data selected for the processing unit currently being processed has not been loaded into the circuit configuration memory, the selected circuit configuration data is loaded into the circuit configuration memory, and the circuit configuration of the reconfigurable circuit is reconfigured in accordance with the loaded, selected circuit configuration data; and
    storing, in a loading unit, selection results of a plurality of pieces of circuit configuration data for individual processing units in at least one line that is immediately before a line in which the processing , unit currently being processed is located and loading into the circuit configuration memory the circuit configuration data corresponding to selection results for individual processing units that are located in the vicinity of the processing unit currently being processed among the selection results for the processing units stored in the loading unit as a predetermined number of pieces of circuit configuration data sorted in descending order of the likelihood of being selected for the processing unit currently being processed.

* * * * *